(12) United States Patent
Tauber et al.

(10) Patent No.: US 11,992,926 B2
(45) Date of Patent: May 28, 2024

(54) HAND-HELD POWER TOOL

(71) Applicant: Robert Bosch GmbH, Stuttgart (DE)

(72) Inventors: Matthias Tauber, Duernau (DE);
Immanuel Werner, Bad Urach (DE);
Hansjoerg Beutel, Pfullingen (DE);
Andreas Strasser, Rudersberg (DE);
Hardy Schmid, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 17/327,267

(22) Filed: May 21, 2021

(65) Prior Publication Data

US 2021/0362312 A1 Nov. 25, 2021

(30) Foreign Application Priority Data

May 25, 2020 (DE) ..................... 10 2020 206 450.4

(51) Int. Cl.
| | | |
|---|---|---|
| *B25D 11/00* | (2006.01) | |
| *B25D 17/02* | (2006.01) | |
| *B25D 17/04* | (2006.01) | |
| *H02P 29/00* | (2016.01) | |
| *B25D 16/00* | (2006.01) | |

(52) U.S. Cl.
CPC ............ *B25D 11/005* (2013.01); *B25D 17/02* (2013.01); *B25D 17/043* (2013.01); *H02P 29/0022* (2013.01); *B25D 16/00* (2013.01); *B25D 2250/095* (2013.01); *B25D 2250/101* (2013.01); *B25D 2250/181* (2013.01); *B25D 2250/201* (2013.01); *B25D 2250/221* (2013.01); *B25D 2250/331* (2013.01); *B25D 2250/375* (2013.01)

(58) Field of Classification Search
CPC ...... B25D 11/005; B25D 16/00; B25D 17/02; B25D 17/043; B25D 2250/095; B25D 2250/101; B25D 2250/181; B25D 2250/201; B25D 2250/221; B25D 2250/331; B25D 2250/375
See application file for complete search history.

(56) References Cited

U.S. PATENT DOCUMENTS

| | | | | |
|---|---|---|---|---|
| 3,269,466 A * | 8/1966 | Mitchell | ................ | B25D 16/00 173/109 |
| 5,533,579 A * | 7/1996 | Chu | ...................... | B25D 17/245 173/13 |
| 6,484,814 B2 * | 11/2002 | Bongers-Ambrosius | ..................... | B25D 16/00 173/179 |
| 6,843,327 B2 * | 1/2005 | Meixner | ............... | B25D 11/125 173/176 |

(Continued)

FOREIGN PATENT DOCUMENTS

| | | | | |
|---|---|---|---|---|
| DE | 43 06 524 A1 | 9/1994 | | |
| DE | 4306524 A1 * | 9/1994 | ............ | B23P 19/066 |

(Continued)

*Primary Examiner* — Thomas M Wittenschlaeger
*Assistant Examiner* — David G Shutty
(74) *Attorney, Agent, or Firm* — Maginot, Moore & Beck LLP

(57) ABSTRACT

A hand-held power tool includes an electric motor, a tool unit, and at least one operating unit. A motor switching unit is configured to sense a contact-pressure characteristic between the tool unit and the operating unit, and configured to switch the electric motor at least partially in dependence on the contact-pressure characteristic.

15 Claims, 4 Drawing Sheets

(56) References Cited

U.S. PATENT DOCUMENTS

| | | | | |
|---|---|---|---|---|
| 6,913,088 B2 * | 7/2005 | Berger | ................ | B25D 17/043 173/48 |
| 8,235,136 B2 * | 8/2012 | Berger | ................ | B25D 17/043 173/48 |
| 8,505,647 B2 * | 8/2013 | Kasuya | ................ | B25D 17/043 173/2 |
| 9,553,542 B2 * | 1/2017 | Machida | ................ | B25D 11/00 |
| 9,737,984 B2 * | 8/2017 | Yamamoto | ............ | B25B 21/008 |
| 9,878,427 B2 * | 1/2018 | Fuchs | ..................... | B25B 21/00 |
| 10,569,405 B2 * | 2/2020 | Kikuchi | ................ | B25D 11/005 |
| 2004/0200628 A1 * | 10/2004 | Schmitzer | ............ | B25D 16/006 173/1 |
| 2009/0314507 A1 * | 12/2009 | Iwakami | ............ | B25D 17/043 173/162.2 |
| 2013/0098648 A1 * | 4/2013 | Furusawa | ................ | B25F 5/02 173/46 |
| 2013/0133911 A1 * | 5/2013 | Ishikawa | ............ | B25B 21/026 173/176 |
| 2013/0186661 A1 * | 7/2013 | Okubo | ..................... | B25F 5/00 173/2 |
| 2013/0277081 A1 * | 10/2013 | Hayashi | ................ | B25F 5/02 173/217 |
| 2015/0000944 A1 * | 1/2015 | Duesselberg | .......... | B25D 17/00 173/90 |
| 2015/0266170 A1 * | 9/2015 | Weller | ................ | B25B 21/02 81/57.42 |
| 2017/0101747 A1 * | 4/2017 | Borgers | ................ | B25D 17/04 |
| 2018/0021931 A1 * | 1/2018 | Abe | ................ | B25D 16/006 173/48 |
| 2018/0099391 A1 * | 4/2018 | Umemoto | ............ | B25D 11/005 |
| 2018/0205244 A1 * | 7/2018 | Ichikawa | ............... | H02J 7/0032 |
| 2020/0078918 A1 * | 3/2020 | Yoshikane | ............... | B25F 5/001 |
| 2021/0339372 A1 * | 11/2021 | Geiger | ............... | B25D 17/043 |

FOREIGN PATENT DOCUMENTS

| | | | | |
|---|---|---|---|---|
| EP | 2 675 592 B1 | | 2/2016 | |
| EP | 2 599 589 B1 | | 4/2017 | |
| IT | 102012902021939 A1 | * | 8/2013 | |
| JP | 2000334625 A | * | 12/2000 | ............ B23P 19/06 |
| WO | WO-2013139425 A1 | * | 9/2013 | ............ B25D 17/04 |

* cited by examiner

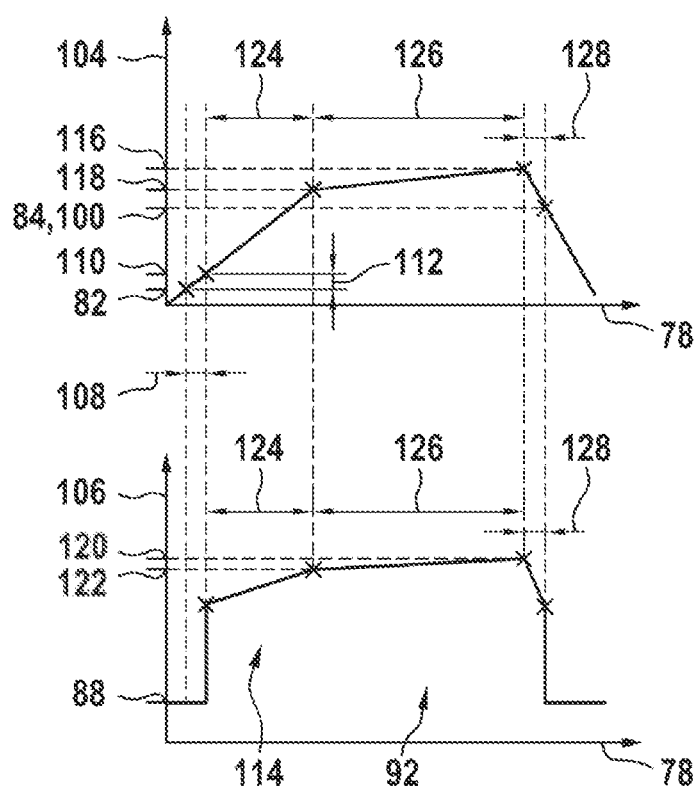

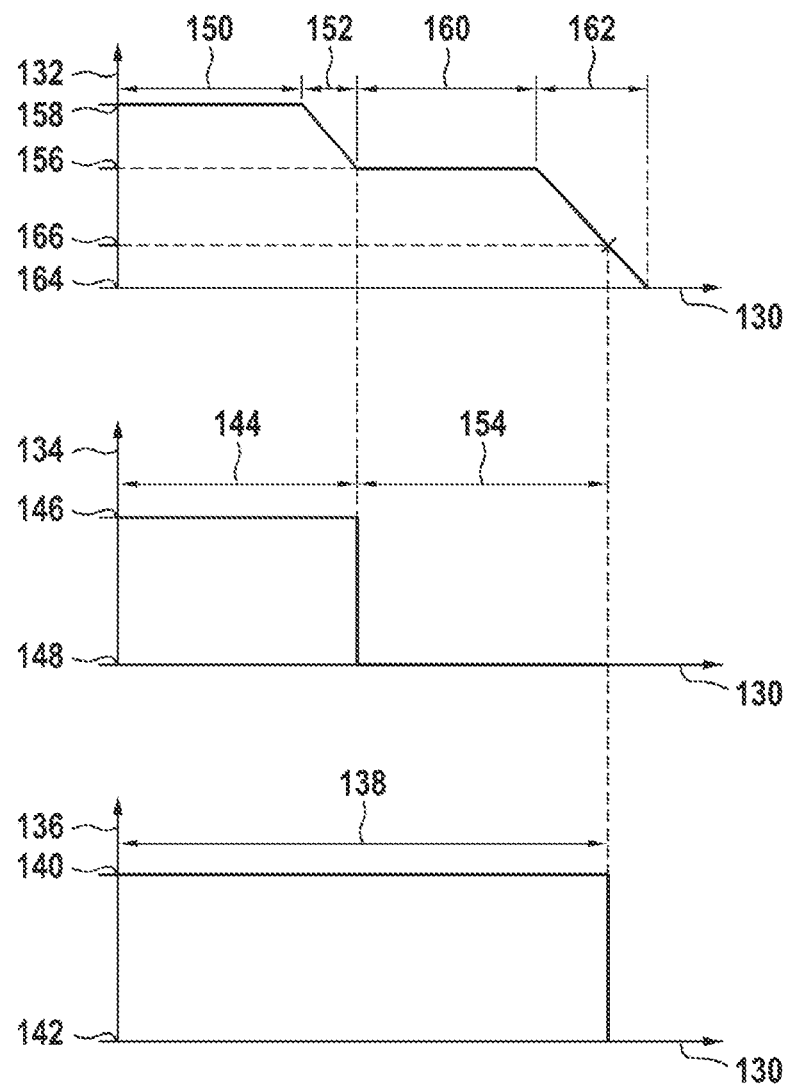

HAND-HELD POWER TOOL

This application claims priority under 35 U.S.C. § 119 to patent application no. DE 10 2020 206 450.4, filed on May 25, 2021 in Germany, the disclosure of which is incorporated herein by reference in its entirety.

BACKGROUND

There has already been proposed a hand-held power tool, in particular a demolition hammer, hammer drill and/or chipping hammer, having at least one electric motor, having a tool unit and at least one operating unit, and having a motor switching unit that is designed to sense a contact-pressure characteristic between the tool unit and the operating unit.

SUMMARY

The disclosure is based on a hand-held power tool, in particular a demolition hammer, hammer drill and/or chipping hammer, having at least one electric motor, having a tool unit and at least one operating unit, and having a motor switching unit that is designed to sense a contact-pressure characteristic between the tool unit and the operating unit.

It is proposed that the motor switching unit be designed to switch the electric motor at least partially in dependence on the contact-pressure characteristic.

Preferably, the hand-held power tool is realized as a portable power tool such as, for example, a demolition hammer, a hammer drill and/or a chipping hammer. It is also conceivable, however, for the hand-held power tool to be of a different design considered appropriate by persons skilled in the art. Preferably, the hand-held power tool has a weight of maximally 30 kg, preferably maximally 15 kg. Preferably, the hand-held power tool has a tool receiver. Preferably, the hand-held power tool has a main handle housing. Preferably, the tool receiver is arranged on the tool unit of the hand-held power tool. Preferably, the main handle housing is arranged on the operating unit. Preferably, the operating unit is mounted so as to be movable, in particular displaceable, relative to the tool unit. Preferably, the hand-held power tool defines a longitudinal axis. Preferably, the operating unit is displaceable by means of a bearing unit of the hand-held power tool, preferably at least substantially parallel to the longitudinal axis, relative to the tool unit. Preferably, the bearing unit has at least one spring unit for damping a bearing movement and/or a percussive upon the operating unit. Preferably, the bearing unit is designed to realize a transmission of force from the tool unit to the operating unit. A "longitudinal axis" of an object is to be understood to mean, in particular, a geometric axis parallel to a longest edge of a smallest geometric cuboid that only just completely encloses the object. The longitudinal axis of the hand-held power tool extends through the hand-held power tool, from the main handle formed by the main-handle housing, towards the tool receiver. The longitudinal axis is at least substantially parallel to an axis of rotation of the hand-held power tool, in particular of the tool receiver. The axis of rotation of the hand-held power tool is, in particular, an axis about which the tool receiver can rotate, in particular rotates in at least one operating state. In particular, the motor switching unit is arranged on the hand-held power tool so as to be at least substantially invisible from the outside. Preferably, the motor switching unit is arranged at least substantially completely in an interior of the hand-held power tool. That "an object is arranged at least substantially completely in an interior of the hand-held power tool" is to be understood to mean, in particular, that a notional straight line passing from a geometric mid-point of the longitudinal axis in the hand-held power tool through the motor switching unit intersects at least one further part of the hand-held power tool that is other than the motor switching unit, in particular at least one housing part, on a side of the longitudinal axis that faces away from the mid-point. "Substantially parallel" is to be understood here to mean, in particular, an alignment of a direction relative to a reference direction, in particular in one plane, the direction deviating with respect to the reference direction by, in particular, less than 8°, advantageously less than 5°, and particularly advantageously less than 2°.

Preferably, the motor switching unit is designed to sense and process a contact-pressure characteristic between the tool unit and the operating unit. In particular, the motor switching unit comprises at least one sensor element for sensing the contact-pressure characteristic.

A "contact-pressure characteristic" is preferably to be understood to mean a characteristic by which a contact pressure can be deduced, the contact-pressure characteristic being dependent, in particular, on a contact pressure between the tool unit and the operating unit. The contact-pressure characteristic is preferably directly or indirectly proportional to the contact pressure between the tool unit and the operating unit. For example, the contact-pressure characteristic may be as a length of a stretching or compression of an element, for example a sensor element, in particular a piezoelectric sensor element. For example, the contact-pressure characteristic may be a frequency, in particular a frequency shift, of an electromagnetic or acoustic wave, that is influenced, for example, by a stretched or compressed sensor element, such as a Bragg fiber. For example, the contact-pressure characteristic may be a force or a pressure. For example, the contact-pressure characteristic may also be realized as a voltage or a current intensity, in particular sensed by a piezoelectric sensor element. In particular, the contact-pressure characteristic may also be realized as a torque. Preferably, the at least one sensor element is realized as a force sensor, optical sensor, in particular a photoelectric sensor, motion sensor, in particular acceleration sensor and/or speed sensor. Preferably, the sensor element is designed to sense the contact-pressure characteristic at least partially as a continuous variable. Alternatively, the at least one sensor element may be realized as a mechanical switch that can sense a binary contact-pressure characteristic. Preferably, the sensor element is designed to sense a relative movement of the operating unit with respect to the tool unit and/or to be actuated in the case of the relative movement, in particular in a region of the relative movement. The sensor element may in particular be realized as a reed switch. The sensor element may in particular be realized as a proximity switch, a magnetic switch and/or an ultrasonic switch. The motor control unit may be realized as a throttle control unit that switches a rotational speed of the electric motor, preferably in proportion to the contact-pressure characteristic, in particular controls, by open-loop and/or closed-loop control, a relative movement of the operating unit with respect to the tool unit.

Preferably, the motor switching unit is realized as a motor open-loop control unit and/or as a motor closed-loop control unit. Preferably, the motor switching unit is designed to switch on the electric motor, in particular to regulate the rotational speed of the electric motor from zero to a non-zero rotational speed. Preferably, the motor switching unit is designed to switch off the electric motor. Preferably, the motor switching unit is designed to regulate the rotational speed of the electric motor from a non-zero rotational speed to zero. Preferably, the motor switching unit is designed to control the rotational speed of the electric motor, by open-loop and/or closed-loop control, on the basis of the sensed contact-pressure characteristic. Preferably, the motor switching unit is designed to increase the rotational speed of the electric motor on the basis of the sensed contact-pressure characteristic. Preferably, the motor switching unit is designed to increase a rotational speed of the electric motor, on the basis of the sensed contact-pressure characteristic, if the contact pressure, corresponding to the contact-pressure characteristic, increases. Preferably, the motor switching unit is designed to increase a rotational speed of the electric motor to a maximum rotational speed, on the basis of the sensed contact-pressure characteristic, if the contact pressure, corresponding to the contact-pressure characteristic, increases over a threshold value.

Preferably, the motor switching unit is designed to put the hand-held power tool into rotational operation on the basis of the sensed contact-pressure characteristic. In the rotational operation, the electric motor drives an insert tool, arranged in the tool receiver, in rotation. Preferably, the motor switching unit is designed to put the hand-held power tool into percussive operation on the basis of the sensed contact-pressure characteristic, in particular if the sensed contact-pressure characteristic exceeds a threshold value. In the percussive operation, the electric motor drives the insert tool arranged in the tool receiver to operate percussively, in particular periodically. Preferably, the motor switching unit is designed to put the hand-held power tool into percussive operation on the basis of the sensed contact-pressure characteristic if the threshold value, in particular a percussion limit value, is exceeded. The motor switching unit may be designed to put the hand-held power tool simultaneously into a rotational operation and a percussive operation. The motor switching unit may be designed to increase a rotational speed for the rotational operation as the contact-pressure characteristic, in particular the contact pressure, increases, up to a maximum rotational speed of the rotational operation, in particular up to the percussion limit value, from which the percussive operation is initiated. In particular, the at least one sensor element may be arranged and/or realized as an end-stop sensor element. In particular, the at least one sensor element may be pressure-sensitive. The motor switching unit may alternatively or additionally have a switch realized as a dead man's switch that, in particular, is arranged on the outside of a cover unit.

As a result of the hand-held power tool being designed according to the disclosure, an advantageously uncomplicated operation of the hand-held power tool can be achieved. In particular, a risk of unintentional actuation of the hand-held power tool can advantageously be reduced. In particular, an optical appearance can advantageously be changed from the common convention of a pistol-like operating element. In particular, advantageously, it is possible to dispense entirely with external operating elements. It can be achieved that cabling is advantageously protected, in particular completely inside, the hand-held power tool. In particular, a user can advantageously apply the hand-held power tool to a workpiece in a precise manner.

It is furthermore proposed that the hand-held power tool have a pneumatic percussion mechanism and a tool receiver, in particular the aforementioned tool receiver, for receiving an insert tool, in particular the aforementioned insert tool, the insert tool being drivable along a work axis, and the motor switching unit being designed to reduce a rotational speed of the electric motor on the basis of the sensed contact-pressure characteristic, in particular to a standstill. The tool receiver may be realized, for example, as a chuck, as an SDS® tool receiver, an SDS®-Plus tool receiver, an SDS®-Max tool receiver or the like. Preferably, the work axis is aligned at least substantially parallel to the axis of rotation and/or to the longitudinal axis of the hand-held power tool. Preferably, the motor switching unit is designed to reduce a rotational speed of the electric motor, on the basis of the sensed contact-pressure characteristic, in the case of reduction of the contact pressure corresponding to the contact-pressure characteristic. Preferably, the motor switching unit is designed to reduce a rotational speed of the electric motor to a standstill, on the basis of the sensed contact-pressure characteristic, in the case of a reduction in the contact pressure corresponding to the contact-pressure characteristic below a threshold value. An advantageously durable hand-held power tool can be achieved. In particular, a risk of a percussive action upon the hand-held power tool, in particular upon a user of the hand-held power tool, can advantageously be reduced.

It is additionally proposed that the hand-held power tool have a pneumatic percussion mechanism, and a tool receiver for receiving an insert tool, the insert tool being drivable along a work axis, the motor switching unit being designed to reduce a rotational speed of the electric motor on the basis of the sensed contact-pressure characteristic in such a manner that activation of the percussion mechanism is avoided. That "activation of the percussion mechanism is avoided when the motor rotational speed is reduced" is to be understood to mean in particular that, when the motor rotational speed is reduced, an air spring pressure in the pneumatic percussion mechanism is maximally 50%, preferably maximally 30%, particularly preferably maximally 20%, and quite particularly preferably maximally 10% of the maximum air spring pressure in the pneumatic percussion mechanism in percussive operation. Preferably, the maximum air spring pressure in percussive operation is approximately 10 bar. In particular, a maximum air spring pressure is a maximum pressure that is attained in a hammer tube between a piston and a striker. An advantageously durable hand-held power tool can be achieved. In particular, a risk of a percussive action upon the hand-held power tool, in particular upon a user of the hand-held power tool, can advantageously be avoided.

It is furthermore proposed that the motor switching unit be designed to passively and/or actively brake the electric motor. Preferably, the electric motor is designed as a DC/EC or an AC/EC motor. Preferably, the motor switching unit is designed to brake the electric motor by short-circuiting or reverse current feed. Preferably, the motor switching unit is designed to passively and/or actively brake a rotational speed of the electric motor, on the basis of the sensed contact-pressure characteristic, in the case of a reduction in the contact pressure corresponding to the contact-pressure characteristic. In particular, a sensor element realized as a proximity switch can already sense the intention to stop operation and actively brake the electric motor in a selective manner, in particular up to 75 ms faster than in the case of a sensor element realized as a pressure switch. An advantageously rapid motor standstill can be achieved, in particular in the case of setting of the operation of the hand-held power tool. Alternatively, the electric motor may also coast to a stop without braking, in particular without regulation of the rotational speed. In particular, a risk of injury to a user of the hand-held power tool can advantageously be limited. In particular, idle strokes can advantageously be avoided.

It is additionally proposed that the tool unit be at least partially formed by a percussion-mechanism housing. Preferably, the tool unit is at least partially formed by the percussion-mechanism housing and the tool receiver. Preferably, the tool unit is at least partially formed by the electric motor. The percussion-mechanism housing is preferably realized as an inner housing. An advantageously large and protected tool unit can be achieved. Advantageous operability of the motor switching unit can be achieved.

It is furthermore proposed that the operating unit be at least partially formed by a main handle housing. Preferably, the operating unit is at least largely formed by the main handle housing. The main handle housing preferably forms the main handle at one end of an extent of the longitudinal axis of the hand-held power tool. The main handle housing may include an ancillary handle. The main handle housing is preferably realized as an outer housing. An advantageously large and protected operating unit can be achieved. Advantageous operability of the motor switching unit can be achieved.

It is additionally proposed that the motor switching unit be designed to assign an active state of the electric motor to a measuring range of the contact-pressure characteristic. Preferably, the measuring range is realized as a range of the contact-pressure characteristic above or below, in particular depending on the proportionality of the contact-pressure characteristic to the contact pressure, at least one threshold value. Preferably, the motor switching unit is designed to put the electric motor into the active state in the measuring range. Preferably, the active state of the electric motor is a state of the electric motor having a non-zero rotational speed, in particular with respect to the rotational operation and/or the percussive operation of the hand-held power tool. Advantageous on/off state control can be achieved by the motor switching unit, which in particular is advantageously programmable for different conditions of use. For example, an advantageously quiet indoor drilling program for concrete walls may be implemented. Alternatively, an advantageously powerful outdoor drilling program for asphalt, stone or the like may be implemented.

It is furthermore proposed that the motor switching unit be designed for at least partially time-dependent switching of the electric motor. Preferably, the motor switching unit is designed for at least partially time-dependent switching of the electric motor with respect to the at least one threshold value of the contact-pressure characteristic being exceeded or undershot. In particular, the motor switching unit may be designed to alter the speed of the electric motor in the case of the at least one threshold value of the contact-pressure characteristic being exceeded and/or undershot for longer than a defined time period, in particular in the case of an increase and/or a reduction in the contact-pressure characteristic. An advantageously uniform, in particular non-sensitive, rotational operation and/or percussive operation can be achieved.

It is additionally proposed that the motor switching unit be designed for at least partially torque-dependent switching of the electric motor. Preferably, the contact-pressure characteristic is realized as a torque, as a characteristic proportional to the torque and/or as a characteristic from which the torque can be calculated. Preferably, the motor switching unit is designed to determine the torque, preferably from the contact-pressure characteristic. In particular, the motor switching unit may comprise a further sensor element for sensing a torque characteristic. Preferably, the torque characteristic is realized as a torque, as a characteristic proportional to the torque and/or as a characteristic from which the torque can be calculated.

Preferably, the motor switching unit is designed for at least partially torque-dependent switching of the electric motor with respect to the at least one threshold value of the contact-pressure characteristic and/or of the torque characteristic being exceeded and/or undershot. In particular, the motor switching unit may be designed to alter the rotational speed of the electric motor in the case of the at least one threshold value of the contact-pressure characteristic and/or of the torque characteristic being exceeded and/or undershot for a period longer than a defined time period, in particular in the case of an increase and/or reduction in the contact-pressure characteristic and/or the torque characteristic value. An advantageously uniform, in particular non-sensitive, rotational operation and/or percussive operation can be achieved. In particular, it can advantageously be ensured that chips are extracted from the workpiece upon the hand-held power tool being switched off and/or the contact pressure being reduced.

It is furthermore proposed that the hand-held power tool have a cover unit, in particular the aforementioned cover unit, the motor switching unit having at least one actuating element, which is completely covered by the cover unit. Preferably, the cover unit is formed at least largely by the main handle housing and by the percussive mechanism housing. The cover unit may be partially formed by a bearing housing of the bearing unit. In particular, the cover unit is realized as a multi-shell housing. In particular, the actuating element may be arranged in the bearing housing. Preferably, the actuating element is at least partially formed by the at least one sensor element of the motor switching unit. Preferably, the at least one, in particular each, actuating element of the motor switching unit is arranged at least substantially entirely in an interior of the hand-held power tool. The term "the at least one actuating element is arranged at least substantially entirely in an interior of the hand-held power tool" is to be understood to mean, in particular, that a notional straight line, that passes from a geometric mid-point of the longitudinal axis in the hand-held power tool through the motor switching unit, intersects at least one further part of the hand-held power tool that is other than the motor switching unit, in particular at least one part of the cover unit, on a side of the longitudinal axis that faces away from the mid-point. It is advantageously possible to achieve non-rotational application of the machine to a workpiece on which work is to be performed. In particular, a safety standard of the hand-held power tool can advantageously be improved. It can be achieved that the electric motor is switched only when required. An advantageously energy-saving hand-held power tool can be realized.

It is additionally proposed that the motor switching unit have at least one switching element that is realized in dependence on the contact-pressure characteristic and that is designed to control a rotational speed of the electric motor, in at least one rotational-speed range, by open-loop and/or closed-loop control. Preferably, the switching element is designed to control the rotational speed of the electric motor, in at least one rotational-speed range, by open-loop and/or closed-loop control if the contact-pressure characteristic exceeds the threshold value. Preferably, the rotational-speed range is a range of rotational speeds between a non-zero minimum rotational speed, in particular percussion activation rotational speed, and a maximum rotational speed. Preferably, the percussion activation rotational speed corresponds to a maximum rotational speed of the rotational operation without percussive operation, in particular in the case of a contact-pressure characteristic that has attained the threshold value for percussion activation. Preferably, the switching element is designed to switch the electric motor to a standard rotational speed, in particular idling rotational speed, in the case of a contact-pressure characteristic that has not exceeded the threshold value for rotational operation and/or percussive operation, in particular not to control it by open-loop and/or closed-loop control. Alternatively, the switching element may be designed to monitor the idling rotational speed, in particular to control it by open-loop and/or closed-loop control. An advantageously uncomplicated rotational-speed start-up phase of the electric motor can be achieved. An advantageous working rotational-speed phase can be achieved in which the rotational speed of the electric motor is continuously controlled in the rotational speed range, by open-loop and/or closed-loop control, in dependence on the contact-pressure characteristic.

It is furthermore proposed that the hand-held power tool have at least one standby switch that is designed to switch the electric motor into a standby state, in particular a non-rotational standby state, or to switch it from a standby state, in particular a non-rotational standby state, into a safety state. Preferably, the standby state is realized as a power supply state of the electric motor in which the electric motor is electrically connected to an energy source. Alternatively or additionally, the standby state may be realized as a blocking state of the relative movement of the tool unit with respect to the operating unit. Preferably, the hand-held power tool comprises at least one indication unit, in particular a light unit and/or acoustic unit, for visually and/or acoustically indicating the standby state. The indication unit may alternatively or additionally be realized as a haptic feedback unit, which in particular triggers a light percussive operation at a low non-zero rotational speed. In particular, the indication unit may be designed to play various sounds, preferably acoustic signals through to melodies, for example, via rotational speed spikes on the electric motor. In particular, the indication unit may be realized as a working lamp of the hand-held power tool, which is designed to illuminate a workpiece on which work is to be performed. In particular, the indication unit may be designed to display different flashing patterns and/or flashing frequencies, brightnesses and/or color changes. Advantageously, a risk of injury due to unintentional starting of the hand-held power tool can be reduced.

It is additionally proposed that the at least one standby switch be realized as a contact switch and/or signal switch. The at least one standby switch is preferably designed, in at least one switching state, to interrupt an electric power supply to the electric motor. The at least one standby switch may alternatively or additionally be designed, in at least one switching state, to block a relative movement of the tool unit with respect to the operating unit. The standby switch may in particular be realized as a pushbutton switch, slide switch or the like. The standby switch may in particular be realized as a capacitive switch, in particular for detecting the presence of a user, or as an inductive switch. The standby switch may be realized, in particular, as a reed switch. The standby switch may be realized, in particular, as a proximity switch, as a magnetic switch and/or as an ultrasonic switch. Advantageously, the risk of injury due to unintentional starting of the hand-held power tool can be reduced.

It is additionally proposed that the hand-held power tool be realized without a percussion-mechanism control. That "the hand-held power tool is realized without a percussion-mechanism control" is preferably to be understood to mean that the hand-held power tool is realized without a percussion-mechanism control that is different from the motor switching unit. In particular, the motor switching unit is designed to control both the percussive operation and the rotational operation, in particular of a hammer drill, by open-loop and/or closed-loop control. In particular, the motor switching unit is designed to switch the percussive operation on or off, at least in a binary manner. Preferably, the motor switching unit is designed to control the percussive operation, by open-loop and/or closed-loop control, in dependence on the contact-pressure characteristic. In particular, the motor switching unit is designed to control both the percussive operation and the rotational operation, in particular of a hammer drill, by open-loop and/or closed-loop control. An advantageously compact and/or lightweight hand-held power tool can be realized. In particular, a hand-held power tool that is advantageously short along the longitudinal axis can be realized. In particular, the tool receiver can be realized without idling travel. Particularly preferably, in each operating state the insert tool bears against a part of the pneumatic percussion mechanism. It can advantageously be achieved that work can be performed horizontally and/or overhead without idling strokes. An advantageously wear-resistant hand-held power tool can be achieved, in particular by use of advantageously low-loaded seals and/or damping, for example on the pneumatic percussion mechanism.

It is additionally proposed that the hand-held power tool comprise a hammer tube, in particular the aforementioned hammer tube, in particular a guide tube, that is realized without closable openings, in particular control openings or idling openings, and/or comprises at least one percussion-mechanism housing and at least one striking pin that is mounted in the percussion-mechanism housing so as to be at least substantially immovable in the direction of percussion. The hammer tube is realized, in particular, designed as a guide tube for guiding a part of the pneumatic percussion mechanism, in particular the piston, the striker, a striking pin or a ram. In particular, the hammer tube may be realized without control openings or idling openings. That the striking pin is mounted in the percussion-mechanism housing so as to be "at least substantially immovable" in the direction of percussion is preferably to be understood to mean that the striking pin is mounted in the percussion-mechanism housing so as to be immovable in the direction of percussion except for a damping-related deviation of maximally 5 mm, preferably maximally 2 mm, particularly preferably maximally 0.5 mm. An advantageously compact hand-held power tool can be achieved. In particular, seals for the striking pin can be realized as advantageously low-wear and/or low-cost static seals. It can be achieved that a user has to apply an advantageously small amount of contact pressure to operate the hand-held power tool. In particular, the tool receiver can be made larger, preferably with longer teeth, which can advantageously increase stability. In particular, a vibration load on the hand-held power tool can be advantageously reduced.

It is furthermore proposed that the hand-held power tool have a battery unit. Preferably, the battery unit is detachably connected to the hand-held power tool. Preferably, the battery unit is designed to supply the hand-held power tool with electrical energy as a primary energy source. Owing to the battery unit, the hand-held power tool is realized, in particular, as a mobile hand-held power tool. Alternatively, the hand-held power tool may be designed for operation with a cable for connection to a socket. An advantageous mobility of the hand-held power tool can be achieved.

In particular, the motor switching unit may be designed to put the pneumatic percussion mechanism into a continuous percussion state. In particular, the motor switching unit may be designed to reduce the motor speed, in particular actively, upon the standby switch being switched off. Advantageous idling vibrations, advantageous noise development and/or advantageous energy consumption can be achieved. The standby switch may be connected to the motor switching unit by an electromechanical coupling, preferably for particularly rapid switching-on and/or switching-off of the electric motor. The hand-held power tool preferably has a transmission unit. The standby switch may be bypassed for a permanent motor function, in particular if, in the case of a hammer drill, the triggering of the mechanical clutch is detected via a current monitor or a change in the frequency band of an accelerometer. In particular, jammed drill bits can be put into rotation by a clutch torque. In particular, the hand-held power tool may have a mode switch for sensing a desired operating mode, in particular percussive operation and/or rotational operation. Preferably, the mode switch is controllable by a mobile phone app. In particular, the percussive operation and/or the rotational operation can be selected via a mobile phone app. The standby switch may be realized as a bistable switch.

The hand-held power tool according to the disclosure is not intended in this case to be limited to the application and embodiment described above. In particular, the hand-held power tool according to the disclosure may have individual elements, component parts and units that differ in number from a number stated herein, in order to fulfill an operating principle described herein. Moreover, in the case of the value ranges specified in this disclosure, values lying within the stated limits are also to be deemed as disclosed and applicable in any manner.

BRIEF DESCRIPTION OF THE DRAWINGS

Further advantages are disclosed by the following description of the drawing. The drawing shows an exemplary embodiment of the disclosure. The drawings, the description and the disclosure contain numerous features in combination. Persons skilled in the art will also expediently consider the features individually and combine them to create appropriate further combinations.

There are shown.

DETAILED DESCRIPTION

Figure 1:
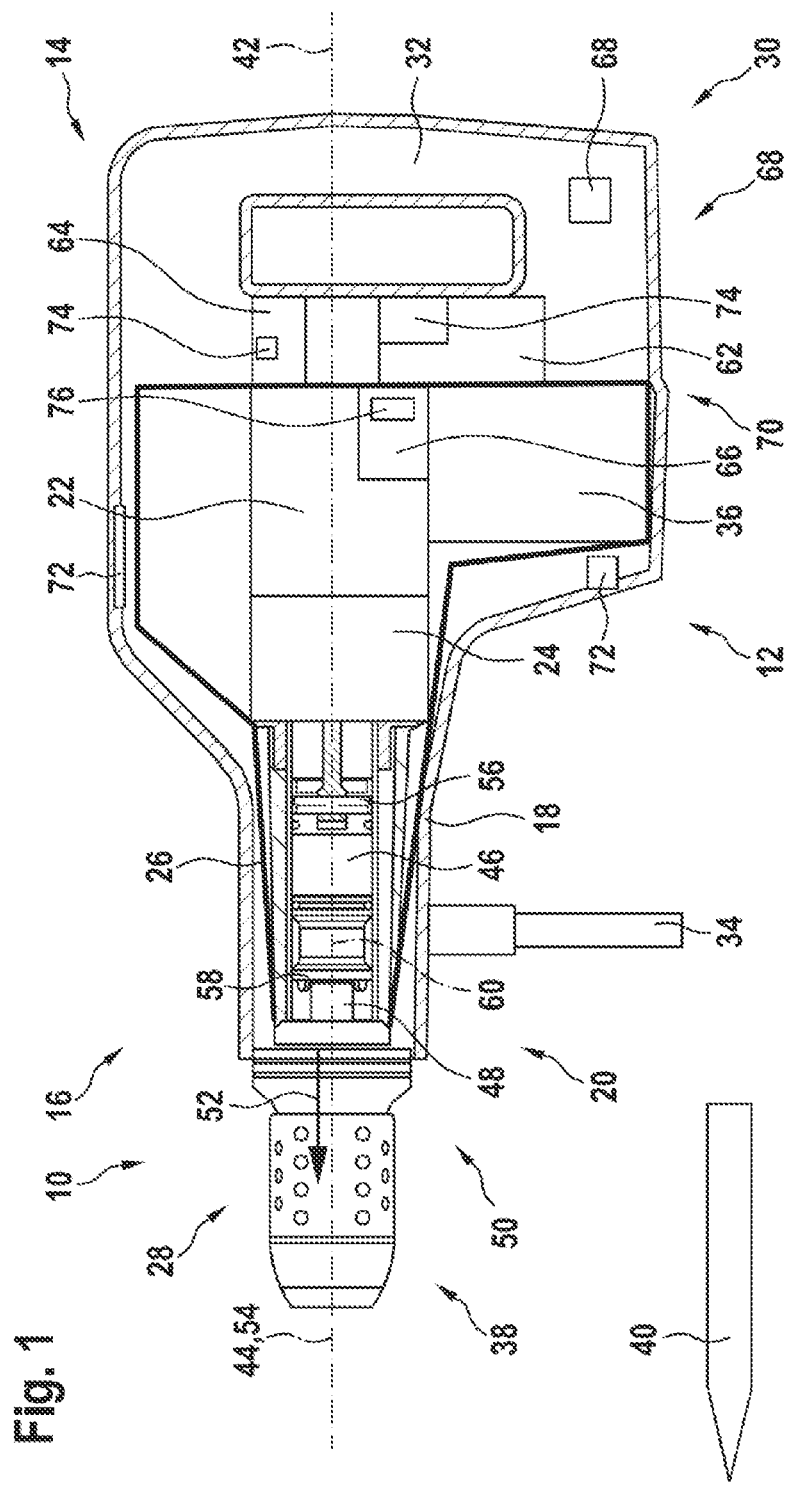
FIG. 1 a hand-held power tool according to the disclosure, in a schematic representation, FIG. 2 a contact-pressure characteristic diagram and a rotational-speed diagram of a hand-held power tool according to the disclosure, in a schematic representation, FIG. 3 a contact-pressure characteristic diagram and a rotational-speed diagram of a hand-held power tool according to the disclosure, in a schematic representation, FIG. 4 a contact-pressure characteristic diagram and a rotational-speed diagram of a hand-held power tool according to the disclosure, in a schematic representation, and FIG. 5 a torque characteristic diagram, a contact-pressure characteristic diagram and a standby-switch state diagram or a motor switching-unit state diagram of a hand-held power tool according to the disclosure, in a schematic representation.

FIG. 1 shows a hand-held power tool 10. The hand-held power tool 10 is realized as a chipping hammer. It is also conceivable, however, for the hand-held power tool 10 to be of another design considered appropriate by persons skilled in the art.

The hand-held power tool 10 comprises an operating unit 14. The hand-held power tool 10 comprises a tool unit 16.

The hand-held power tool 10 comprises a cover unit 12. The hand-held power tool 10 comprises a main handle housing 18, which in particular forms a main handle 32. The hand-held power tool 10 comprises a percussion-mechanism housing 26, which in particular is designed to receive a percussion mechanism 20.

The operating unit 14 is partially formed by the main handle housing 18. The tool unit 16 is partially formed by the percussion-mechanism housing 26. The cover unit 12 is partially formed by the main handle housing 18. The cover unit 12 is partially formed by the percussion-mechanism housing 26. The cover unit 12 is at least substantially formed by the main handle housing 18 and the percussion-mechanism housing 26. The percussion-mechanism housing 26 is realized as an inner housing, in particular for the pneumatic percussion mechanism 20, an electric motor 22 and a battery unit 36. The main handle housing 18 is realized as an outer housing, in particular for receiving the mounted percussion-mechanism housing 26.

The tool unit 16 is arranged at a front region 28 of the main handle housing 18. At an end region 30, the main handle housing 18 is shaped to realize the main handle 32, in particular for guiding the hand-held power tool 10 and for applying a force from an operator to the hand-held power tool 10.

The hand-held power tool 10 is realized with a detachable ancillary handle 34. The ancillary handle 34 may be releasably attached to the portable hand-held power tool 10 via a latching connection or other connections considered appropriate by persons skilled in the art. The ancillary handle 34 is arranged on the percussion-mechanism housing 26, for guiding of the hand-held power tool 10 by the operator.

The hand-held power tool 10 additionally comprises the electric motor 22. The hand-held power tool 10 has a transmission unit 24. The electric motor 22 and the transmission unit 24 are arranged in the cover unit 12. The electric motor 22 and the transmission unit 24 are arranged in the percussion-mechanism housing 26. In particular, the electric motor 22 partially forms the tool unit 16. In particular, the transmission unit 24 partially forms the tool unit 16. The hand-held power tool 10 comprises the battery unit 36. The battery unit 36 is arranged in the percussion-mechanism housing 26. In particular, the battery unit 36 partially forms the tool unit 16. The battery unit 36 is designed to supply the electric motor 22 with electrical energy. The battery unit 36 is arranged so as to be detachable from the percussion-mechanism housing 26, for example via electrical plug-in and/or latching contacts. In particular, the percussion-mechanism housing 26 can be detached from the main handle housing 18.

The hand-held power tool 10 comprises a tool receiver 38 for receiving an insert tool 40. The insert tool 40 is exemplarily realized as a chisel. The tool receiver 38 is arranged in the front region 28 of the hand-held power tool 10. The tool receiver 38 is in particular realized as an SDS® tool receiver. The tool receiver 38 may be of any design considered appropriate by persons skilled in the art, such as, for example a design as a chuck, SDS®-Plus tool receiver, SDS®-Max tool receiver or the like.

The hand-held power tool 10 defines a longitudinal axis 42 from the main handle 32 to the tool receiver 38, in particular along a longitudinal tool axis of the insert tool 40 in an operating state.

The longitudinal axis 42 of the hand-held power tool 10 extends, through the hand-held power tool 10, from the main handle housing 18 towards the tool receiver 38. The longitudinal axis 42 is at least substantially parallel to an axis of rotation 44 of the hand-held power tool 10, in particular in the case of the hand-held power tool 10 being realized as a hammer drill, in particular the tool receiver 38, preferably the insert tool 40. The axis of rotation 44 of the hand-held power tool 10, in particular in the case of the hand-held power tool 10 being realized as a hammer drill, is in particular an axis about which the tool receiver 38 can rotate, in particular rotates in at least one operating state. The hand-held power tool 10 may have the insert tool 40.

The hand-held power tool 10 comprises, in particular, at least one pneumatic percussion mechanism 20. The pneumatic percussion mechanism 20 is arranged at least largely in the percussion-mechanism housing 26. The pneumatic percussion mechanism 20 partially forms the tool unit 16. The tool receiver 38 partially forms the tool unit 16.

The pneumatic percussive mechanism 20 comprises, in particular, a hammer tube 46, in particular a guide tube. The hammer tube 46, in particular the guide tube, is realized without closable openings. The hammer tube 46, in particular the guide tube, is realized without closable openings, in particular control openings or idling openings. In particular, the hammer tube 46 is realized without openings in a region between a piston 56 and a striker 58.

A maximum air-spring pressure is, in particular, a maximum pressure that is attained in the hammer tube 46 between the piston 56 and the striker 58 in percussive operation. In particular, in percussive operation the piston 56 is moved slowly in such a manner that the maximum air-spring pressure attains a maximum of 1 bar and, in particular, a percussion mechanism activation is avoided.

The pneumatic percussion mechanism 20 comprises a striking pin 48. The striking pin 48 is mounted, in particular by bearings and/or spring elements 50, in the percussion-mechanism housing 26 so as to be at least substantially immovable in a direction of percussion 52, in particular at least with respect to the hammer tube 46. The direction of percussion 52 corresponds to the longitudinal axis 42.

The insert tool 40 is drivable along a work axis 54, in particular by the electric motor 22 via the transmission unit 24 and/or the pneumatic percussion mechanism 20.

For the purpose of generating and/or transmitting a percussive pulse by the pneumatic percussion 20, the hand-held power tool 10 has the electric motor 22 and the transmission unit 24.

An axis of movement 60 of a striking element, in particular of the piston 56, of the striker 58, of the pneumatic percussion mechanism 20 is parallel to the longitudinal axis 42, the tool receiver 38, in particular to the direction of percussion 52 or to the work axis 54. In principle, it is also conceivable that, via the transmission unit, the drive torque for generating a rotational motion of the tool receiver via, for example, a hammer tube of the pneumatic percussion mechanism can be transmitted to the tool receiver in a manner already known to persons skilled in the art.

The hand-held power tool 10 has a bearing unit 62. By means of the bearing unit 62, the operating unit 14 is mounted so as to be linearly displaceable, preferably at least substantially parallel to the longitudinal axis 42, in particular parallel to the work axis 54, relative to the tool unit 16. The bearing unit 62 has a spring unit 64 for cushioning a bearing movement and a transmission of force to the operating unit 14, in particular in a percussive operation. The bearing unit 62 has, in particular, a return element that counteracts a displacement of the tool unit 16 in the direction of the main handle 32, in order to return it to an original position in the absence of a contact pressure, in particular against a workpiece.

The hand-held power tool 10 may have a standby switch 68, which is indicated in particular in FIG. 1. The standby switch 68 is designed to switch the electric motor 22 into a standby state, in particular a non-rotational standby state, or to switch it from a standby state, in particular a non-rotational standby state, into a safety state. The standby state is realized as a power supply state of the electric motor 22 in which the electric motor 22 is electrically connected to an energy source, in particular the battery unit 36. Alternatively or additionally, the standby state may be realized as a blocking state of the bearing unit 62, in particular of a relative movement of the tool unit 16 with respect to the operating unit 14. The standby switch 68 may be realized as a contact switch and/or signal switch. In particular, the standby switch 68 may be arranged on the outside of the main handle housing 18 (indicated in FIG. 1). In principle, the standby switch 68 may also be arranged at other locations of the hand-held power tool 10 that are considered appropriate by persons skilled in the art.

The hand-held power tool 10 may have an indication unit 70, in particular a light unit and/or acoustic unit, for visually and/or acoustically indicating the standby state. The indication unit 70 is in particular arranged on the outside of the main handle housing 18 or on the percussion-mechanism housing 26, in particular close to the tool receiver 38.

The hand-held power tool 10 comprises a motor switching unit 66. The motor switching unit 66 is designed to sense a contact-pressure characteristic between the tool unit 16 and the operating unit 14.

The motor switching unit 66 has two actuating elements 72, in particular and/or two switching elements 74, which are completely covered by the cover unit 12. The actuating elements 72, in particular the two switching elements 74, are designed to sense the contact-pressure characteristic between the tool unit 16 and the operating unit 14. The actuating elements 72, in particular the two switching elements 74, are arranged close to the bearing unit 62. The actuating elements 72, in particular the two switching elements 74, are realized as sensor elements.

The actuating elements 72 are realized, for example, as optical sensor elements that are designed to sense, as a contact-pressure characteristic, a displacement of the percussion-mechanism housing 26 relative to the main handle housing 18. In particular, the displacement of the percussion-mechanism housing 26 relative to the main handle housing 18 is directly proportional to a contact pressure that can be exerted upon the insert tool 40 by a user via the main handle 32 and/or the ancillary handle 34. In particular, the optional switching elements 74 are realized in dependence on the contact-pressure characteristic. In particular, the optional switching elements 74 may be realized as piezoelectric sensors for sensing a contact pressure as a contact-pressure characteristic, which in particular is directly proportional to the contact pressure. In particular, the actuating elements 72, in particular and/or the switching elements 74, may be designed to sense a torque at the tool receiver 38, in particular via a power consumption, in particular a current intensity, at the electric motor 22. The actuating elements 72 may be arranged, for example, on the bearing unit 62, in particular for the purpose of sensing a displacement of a part of the bearing unit 62.

Further, the motor switching unit 66 is designed to switch the electric motor 22 at least partially in dependence on the contact-pressure characteristic. The motor switching unit 66 has at least one further switching element 76, which is designed to be dependent on the contact-pressure characteristic, and which is designed to control the rotation speed of the electric motor 22 by open-loop and/or closed-loop control. The further switching element 76 is designed to control the rotational speed of the electric motor 22, in at least one speed range, by open-loop and/or closed-loop control.

Figure 2:
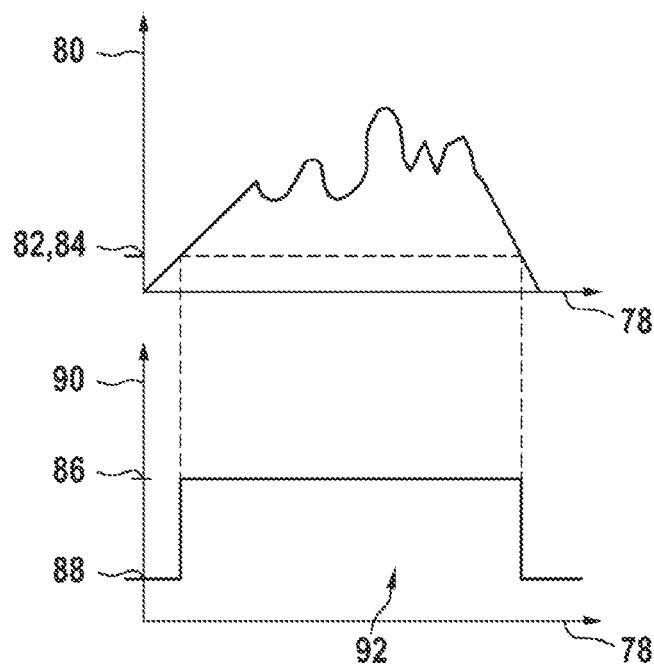

FIG. 2 shows a further contact-force characteristic diagram, in particular an upper diagram, and a corresponding rotational speed diagram, in particular a lower diagram, of the electric motor 22 achieved by the motor switching unit 66.

A time is plotted on the abscissas 78 of the diagrams. On the ordinate 80 of the contact-pressure characteristic diagram, the contact-pressure characteristic, in particular a path of a relative movement, is plotted. A rotational speed of the electric motor 22 is plotted on the ordinate 90 of the rotational speed diagram.

The motor switching unit 66 is designed to switch on the electric motor 22 on the basis of the sensed contact-pressure characteristic, in particular to switch a rotational speed of the electric motor 22 to a non-zero rotational speed, in particular operating speed 86. The motor switching unit 66 is designed to switch on the electric motor 22 if the sensed contact-pressure characteristic exceeds a threshold value, in particular switch-on threshold value 82, in particular to switch the rotational speed of the electric motor 22 to a non-zero operating speed 86 (cf. diagrams in FIG. 2).

In this example, the motor switching unit 66 switches the rotational speed of the electric motor 22 above the switch-on threshold value 82 to a constant non-zero operating speed 86, for example a maximum possible rotational speed, irrespective of any further progression of the sensed contact-pressure characteristic.

The motor switching unit 66 is designed to assign an active state 92 of the electric motor 22 to a measuring range of the contact-pressure characteristic. In particular, the motor switching unit 66 assigns the active state 92 of the electric motor 22 to a measuring range of the contact-pressure characteristic above the switch-on threshold value 82.

The motor switching unit 66 is designed to switch off the electric motor 22 if the sensed contact-pressure characteristic undershoots a threshold value, in particular switch-off threshold value 84, in particular to switch the rotational speed of the electric motor 22 to a zero rotational speed 88 (cf. diagrams in FIG. 2). In particular, in this example, the switch-on threshold 82 and the switch-off threshold 84 are designed to be the same.

The motor switching unit 66 is designed to reduce a rotational speed of the electric motor 22 on the basis of the sensed contact-pressure characteristic, in particular to a standstill.

The motor switching unit 66 is designed to reduce a rotational speed of the electric motor 22 on the basis of the sensed contact-pressure characteristic in such a manner that activation of the percussion mechanism is avoided.

The motor switching unit 66 may be designed to passively brake the electric motor 22. The motor switching unit 66 is designed to actively brake the electric motor 22, in particular, in such a rapid manner that activation of the percussion mechanism is avoided.

Figure 3:
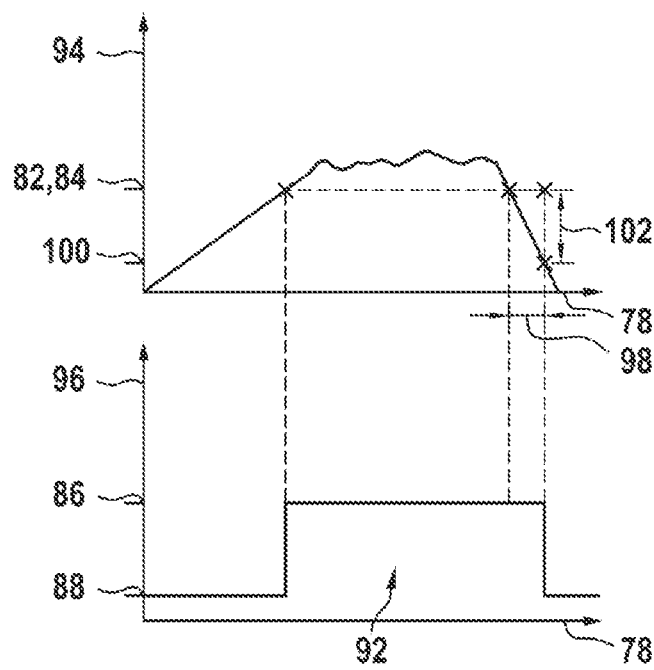

FIG. 3 shows a contact-pressure characteristic diagram, in particular the upper diagram, and a corresponding rotational speed diagram, in particular the lower diagram, of the electric motor 22 attained by the motor switching unit 66.

A time is plotted on the abscissas 78 of the diagrams. On the ordinate 94 of the contact-pressure characteristic diagram, the contact-pressure characteristic, in particular a path of a relative movement, is plotted. A rotational speed of the electric motor 22 is plotted on the ordinate 96 of the rotational speed diagram.

The motor switching unit 66 is designed to switch on the electric motor 22 if the sensed contact-pressure characteristic exceeds a threshold value, in particular the switch-on threshold value 82, in particular to switch the rotational speed of the electric motor 22 to a non-zero operating speed 86 (cf. diagrams in FIG. 2). In this example, the motor switching unit 66 switches the rotational speed of the electric motor 22 above the switch-on threshold value 82 to a constant non-zero operating speed 86, for example a maximum possible speed, irrespective of a further progression of the sensed contact-pressure characteristic. The motor switching unit 66 is designed to assign the active state 92 of the electric motor 22 to a measuring range of the contact-pressure characteristic. In particular, the motor switching unit 66 assigns the active state 92 of the electric motor 22 to a measuring range of the contact-pressure characteristic from an initial exceeding of the switch-on threshold value 82 to an undershooting of a real switch-off value 100. After a defined time period 98, the real switch-off value 100 of the contact-pressure characteristic is not necessarily equal to the switch-off threshold value 84. The real switch-off value 100 differs by a contact-pressure characteristic difference 102 that is other than zero.

The motor switching unit 66 is designed for at least partially time-dependent switching of the electric motor 22. The motor switching unit 66 is designed to switch off the electric motor 22 after a defined time period 98 if the sensed contact-pressure characteristic undershoots a threshold value, in particular the switch-off threshold value 84, in particular to switch the rotational speed of the electric motor 22 to a zero rotational speed 88 (cf. diagrams in FIG. 2). In particular, in this example, the switch-on threshold 82 and the switch-off threshold 84 are designed to be the same.

FIG. 4 shows a further contact-pressure characteristic diagram, in particular the upper diagram, and a corresponding rotational speed diagram, in particular the lower diagram, of the electric motor 22 attained by the motor switching unit 66.

A time is plotted on the abscissas 78 of the diagrams. Plotted on the ordinate 104 of the contact-pressure characteristic diagram is the contact-pressure characteristic, in particular a path of a relative movement. A rotational speed of the electric motor 22 is plotted on the ordinate 106 of the rotational speed diagram.

The motor switching unit 66 is designed to switch on the electric motor 22 if the sensed contact-pressure characteristic exceeds a threshold value, in particular the switch-on threshold value 82, after a defined time period 108, in particular to switch the rotational speed of the electric motor 22 to a non-zero variable variation operating rotational speed 114 (cf. diagrams in FIG. 4).

After the defined time period 108, a real switch-on value 110 of the contact-pressure characteristic is not necessarily equal to the switch-on threshold value 82. The real switch-on value 110 differs, for example, by a non-zero contact-pressure characteristic difference 112.

In this example, the motor switching unit 66 switches the rotational speed of the electric motor 22 above the switch-on threshold value 82 to different non-zero variation operating rotational speeds 114 in dependence on a further progression of the sensed contact-pressure characteristic.

During a time period 124, the motor switching unit 66 switches the rotational speed of the electric motor 22 to an intermediate speed 120 in a linearly increasing manner in accordance with a linearly increasing sensed contact-pressure characteristic.

During the time period 124, the motor switching unit 66 senses a linearly increasing contact-pressure characteristic that increases to an intermediate contact-pressure characteristic 118.

During a time period 126, the motor switching unit 66 switches the rotational speed of the electric motor 22 in a linearly increasing manner, in accordance with a linearly increasing sensed contact-pressure characteristic, to a maximum rotational speed 122 in this active state 92. The maximum rotational speed 122 does not necessarily have to, but may, correspond to a maximum possible rotational speed of the electric motor 22.

During the time period 126, the motor switching unit 66 senses a linearly increasing contact-pressure characteristic, which increases to a maximum contact-pressure characteristic 116.

During a time period 128, the motor switching unit 66 switches the rotational speed of the electric motor 22 in a linearly descending manner, in accordance with a linearly descending sensed contact-pressure characteristic, until it undershoots the switch-off threshold value 84. In particular, the switch-off threshold value 84 is realized as a function, for example as a percentage function, of the maximum value of the contact-pressure characteristic, in particular the maximum contact-pressure characteristic 116, such as, in particular, approximately as 75% of the maximum value. In this way, the switch-off threshold value can be above the switch-on threshold value.

The motor switching unit 66 is designed to switch off the electric motor 22 when the sensed contact-pressure characteristic falls below a threshold value, in particular switch-off threshold value 84, in particular to switch the speed of the electric motor 22 to a zero speed 88 (cf. diagrams in FIG. 2).

The motor switching unit 66 is designed to assign the active state 92 of the electric motor 22 to a measuring range of the contact-pressure characteristic. In particular, the motor switching unit 66 assigns the active state 92 of the electric motor 22 to a measuring range of the contact-pressure characteristic from an initial exceeding of the real switch-on value 110 to an undershooting of the switch-off threshold value 84. In particular, the motor switching unit 66 assigns the active state 92 of the electric motor 22 to a measuring range of the contact-pressure characteristic from an initial exceeding of the switch-on threshold value 82, in particular of a real switch-on value 110, to an undershooting of the switch-off threshold value 84, in particular of the real switch-off value 100.

In particular, in this example, the switch-on threshold value 82 and the switch-off threshold value 84 are not identical.

FIG. 5 shows a torque characteristic diagram (upper diagram), a contact-force characteristic diagram (middle diagram) and a standby switch state diagram or motor switching-unit diagram (lower diagram).

In this example, the motor switching unit 66 is designed for at least partially torque-dependent switching of the electric motor 22.

A time is plotted on the abscissas 130 of the diagrams. A torque characteristic, in particular a current intensity, is plotted on the ordinate 132 of the torque characteristic diagram. A contact-pressure characteristic is plotted on the ordinate 134 of the contact-pressure characteristic diagram. A switch state, in particular an on state 140 or an off state 142, is plotted on the ordinate 136 of the standby switch state diagram or the motor switching-unit diagram.

During a time period 138, the standby switch 68 or the motor switching unit 66, in particular a switching element 74 of the motor switching unit 66, is in an on state 140. Outside the time period 138, the standby switch 68 or the motor switching unit 66, in particular a switching element 74 of the motor switching unit 66, is in an off state 142.

During a time period 144, a non-zero contact-pressure characteristic value 146 is sensed by the motor switching unit 66. During a time period 154, a zero contact-pressure characteristic 148 is sensed by the motor switching unit 66.

During a time period 150, the torque characteristic, in particular current consumption, in particular as current intensity, at the tool receiver 38, in particular at the electric motor 22, is sensed as a non-zero torque characteristic 158, which in particular belongs to a working-load torque corresponding to the contact-pressure characteristic 146, in particular corresponding to a working state of the hand-held power tool 10 on a workpiece.

During a time period 152, the torque characteristic, in particular current consumption, in particular as current intensity, at the tool receiver 38, in particular at the electric motor 22, drops to a torque characteristic value 156, which in particular belongs to a drilling-dust conveying torque corresponding to the zero contact-pressure characteristic 148, in particular corresponding to a working state of the hand-held power tool 10 on a workpiece.

During a time period 160, the torque characteristic, in particular current consumption, in particular as current intensity, at the tool receiver 38, in particular at the electric motor 22, is sensed as a non-zero torque characteristic value 156, which in particular belongs to a working-load torque, which corresponds to the contact-pressure characteristic value 146, in particular corresponds to a working state of the hand-held power tool 10 on a workpiece.

During a time period 162, the torque characteristic, in particular current consumption, in particular as current intensity, at the tool receiver 38, in particular at the electric motor 22, drops to a zero torque characteristic value 164, which in particular belongs to an unloaded hand-held power tool 10, which corresponds to the zero contact-pressure characteristic value 148, in particular to an off state of the hand-held power tool 10 or to a working state of the hand-held power tool 10 free of a load caused by a workpiece or drilling dust.

During the time period 162, the torque characteristic falls below a torque characteristic threshold value 166. The motor switching unit 66 is configured to brake the electric motor 22 to the zero rotational speed 88 if the torque characteristic falls below the torque characteristic threshold value 166. The standby switch 68 may be configured to change to the off state 142 if the torque characteristic threshold value 166 is undershot, and in particular to interrupt an electric power supply to the electric motor 22.

In particular, the motor switching unit 66 and the standby switch 68 may be mechanically and/or electrically connected.

In particular, the hand-held power tool 10 maybe realized without a percussion-mechanism control. In particular, the pneumatic percussion mechanism 20 may be controlled by the motor switching unit 66.

The on state 140 of the standby switch 68 is, in particular, the standby state. The off state 142 of the standby switch 68 is, in particular, the safety state.

What is claimed is:

1. A hand-held power tool, comprising:
an electric motor;
a tool unit;
at least one operating unit; and
a motor switching unit configured to sense a contact-pressure characteristic between the tool unit and the operating unit, and configured to switch on the electric motor after a predefined time period, greater than zero, from when the sensed contact-pressure characteristic exceeds a switch-on threshold value, wherein
the motor switching unit is configured for at least partially torque-dependent switching of the electric motor, and
the at least partially torque-dependent switching comprises, in response to a sensed torque dropping below a threshold torque, at least one of (i) interrupting an electric power supply to the electric motor, and (ii) braking the electric motor.

2. The hand-held power tool according to claim 1, further comprising:
a pneumatic percussion mechanism; and
a tool receiver configured to receive an insert tool, the insert tool drivable along a work axis, wherein
the motor switching unit is configured to reduce a rotational speed of the electric motor based on the sensed contact-pressure characteristic to a standstill.

3. The hand-held power tool according to claim 1, further comprising:
a pneumatic percussion mechanism; and
a tool receiver configured to receive an insert tool, the insert tool drivable along a work axis, wherein
the motor switching unit is configured to reduce a rotational speed of the electric motor based on the sensed contact-pressure characteristic such that activation of the pneumatic percussion mechanism is avoided.

4. The hand-held power tool according to claim 1, wherein the motor switching unit is configured to at least one of passively brake the electric motor and actively brake the electric motor.

5. The hand-held power tool according to claim 1, wherein the tool unit is at least partially formed by a percussion-mechanism housing.

6. The hand-held power tool according to claim 1, wherein the at least one operating unit is at least partially formed by a main handle housing.

7. The hand-held power tool according to claim 1, wherein the motor switching unit is configured to assign an active state of the electric motor to a measuring range of the contact-pressure characteristic.

8. The hand-held power tool according to claim 1, wherein the motor switching unit is configured for at least partially time-dependent switching of the electric motor.

9. The hand-held power tool according to claim 1, further comprising:
a cover unit, the motor switching unit having at least one actuating element which is completely covered by the cover unit.

10. The hand-held power tool according to claim 1, wherein the motor switching unit includes at least one switching element that is realized in dependence on the contact-pressure characteristic and that is configured to control a rotational speed of the electric motor in at least one rotational-speed range by at least one of open-loop control and closed-loop control.

11. The hand-held power tool according to claim 1, further comprising:
at least one standby switch configured to at least one of switch the electric motor into a non-rotational standby state, and switch the electric motor from a non-rotational standby state into a safety state.

12. The hand-held power tool at least according to claim 11, wherein the at least one standby switch is realized as at least one of a contact switch and a signal switch.

13. The hand-held power tool according to claim 1, wherein the hand-held power tool does not include a percussion-mechanism control.

14. The hand-held power tool according to claim 1, further comprising:
one or more of
a hammer tube configured as a guide tube that is realized without closable control openings or closable idling openings, and
at least one percussion-mechanism housing and at least one striking pin that is mounted in a percussion-mechanism housing so as to be at least substantially immovable in a direction of percussion.

15. The hand-held power tool according to claim 1, wherein the hand-held power tool is one of a demolition hammer, a hammer drill, and a chipping hammer.

* * * * *